March 28, 1961

W. F. TIBBETTS 2,976,603

BURNISHING TOOL

Filed Dec. 23, 1957

INVENTOR.
WILLIS F. TIBBETTS
BY
ATTORNEY

March 28, 1961 W. F. TIBBETTS 2,976,603
BURNISHING TOOL
Filed Dec. 23, 1957 2 Sheets-Sheet 2

INVENTOR.
WILLIS F. TIBBETTS
BY
ATTORNEY

United States Patent Office 2,976,603
Patented Mar. 28, 1961

2,976,603
BURNISHING TOOL

Willis F. Tibbetts, Reading, Mass., assignor to Flightex Fabrics, Inc., Providence, R.I., a corporation of Rhode Island Filed Dec. 23, 1957, Ser. No. 704,715
6 Claims. (Cl. 29—90)

The present invention relates to a tool for use in burnishing cylindrical work.

In burnishing cylindrical work, minor variations in diameter have imposed troublesome limitations on the effectiveness of the operation. The principal objective of the present invention is to provide a tool adapted to satisfactorily burnish cylindrical work where variations in diameter are present that are so appreciable as to render other burnishing tool use ineffective.

In accordance with the invention, this generally stated objective is attained by means of a tool whose spindle has a body to which a sleeve is slidably connected for axial movement relative thereto. The sleeve is provided with a mandrel in which circumferentially spaced and arranged burnishing rolls are slidably mounted for movement along axes that are forwardly and inwardly inclined with respect to the spindle axis for engagement with the work by corresponding end portions. The spacing of the work engaging end portions of the rolls relative to the spindle axis varies with their axial movement relative to the mandrel and their other end portions are connected to the body by an anti-friction thrust coupling so that movement of the burnishing rolls relative to their mandrel is attended by relative axial movement between the body and the sleeve.

Such relative axial movement between the body and the sleeve is yieldably and, preferably, adjustably opposed during the work stroke. In practice, it is preferred that the means for yieldably opposing that movement be double acting, air cylinder-piston unit or units, with an electrical control provided with limit switches, subject to operation, as by the reciprocating drive of equipment to which the burnishing tool is connected, typically to relieve the opposition, during the return stroke of the burnishing tool relative to the work, to movement of the rolls away therefrom.

In the accompanying drawings there is shown an illustrative embodiment of the invention from which these and other of its objectives, novel features, and advantages will be readily apparent.

Figure 1:
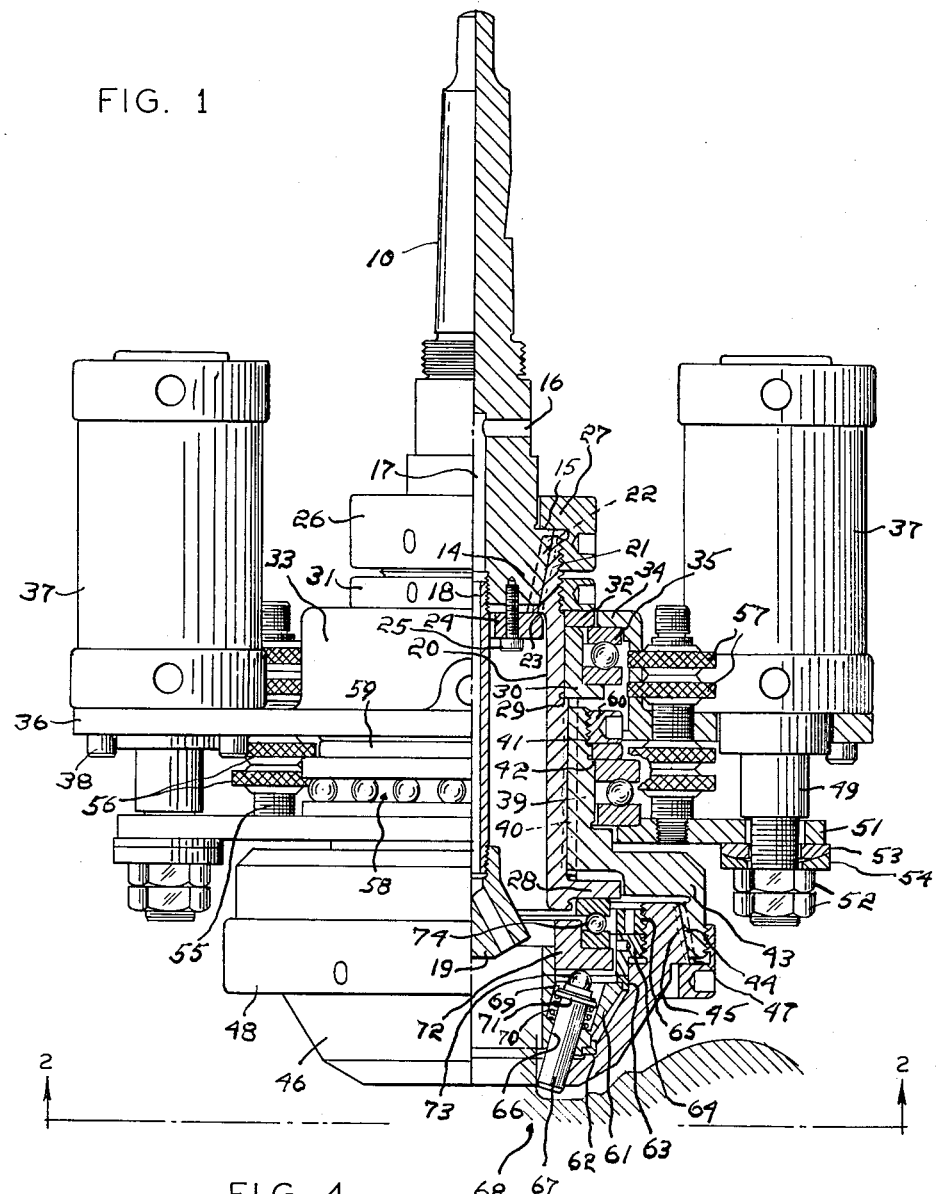
Fig. 1 is a partly sectioned side view of a burnishing tool in accordance with the invention.
Figure 4:
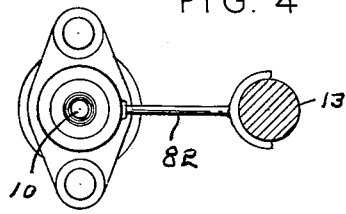
Fig. 4 is a top plan view of the tool indicating its relationship to the apparatus by which it is driven.
Figure 2:
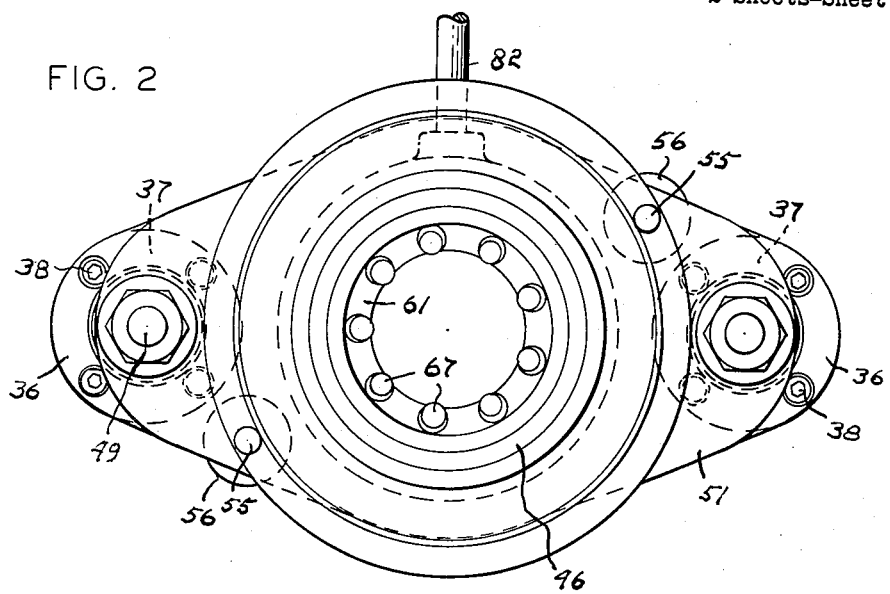
Fig. 2 is a view of the work receiving and contacting end thereof taken approximately along the indicated lines 2—2 of Fig. 1.
Figure 3:
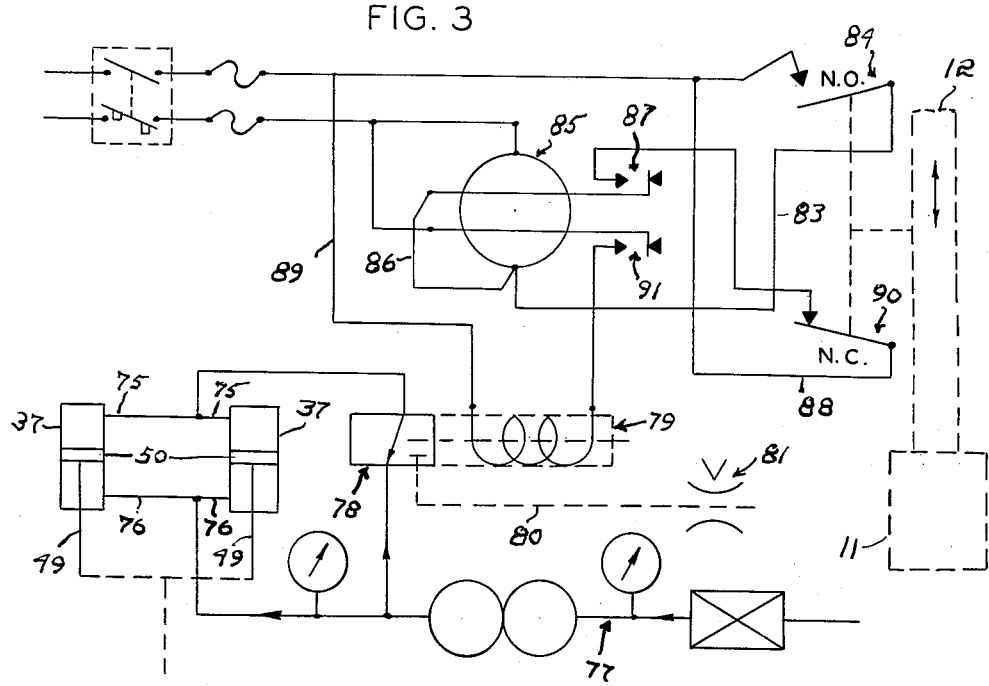
Fig. 3 is a schematic view of an automatic control of the burnishing tool.

With reference to the embodiment of the invention shown in the drawings, it will be noted that there is a spindle 10 adapted for conventional attachment to the chuck indicated at 11 in Fig. 3 and carried by rotatable and reciprocable driving spindle or stem 12 of a drill or like press, not shown, but whose post is shown at 13 in Fig. 4. The spindle 10 has a downwardly and inwardly tapering shank end 14 defined by a shoulder 15 above which there is an oil inlet port 16 in communication with the axial bore 17 into which is threaded the pipe 18 carrying the oil nozzle 19.

A hollow body 20 has, at one end, a seat 21 outwardly and upwardly tapered to receive the shank end 14 and is slidably keyed thereto as at 22. The body 20 has an internal annular shoulder 23 engaged by the clamping washer 24 which is locked to the shank end 14 as by cap screws 25. A nut 26 is threaded on the upper end of the body 20 and it is formed with a portion 27 annularly engaging the spindle shoulder 15.

The body 20 has, at its other end, an external flange 28 and an intermediate shoulder 29. A thrust element 30 is seated on the shoulder 29 by the nut 31 threaded on the body 20 against the interposed thrust washer 32. A hub 33 has an upper, inturned flange 34 between which and the thrust element 30 there is an interposed ball-bearing unit 35 and a bottom, outward flange 36 constituting a seat for the cylinders 37 which are locked thereto as by cap screws 38.

A sleeve 39 is slidably splined to the body 20 as at 40 for limited axial movement relative thereto, adjacent its upper end, the sleeve 39 has shoulders 41 and 42. Its other end has a flared head 43 provided with an upwardly and inwardly tapering seat 44 for the correspondingly shaped end 45 of the mandrel 46 to which it is keyed as at 47. The mandrel 46 is held to the head 43 by means of a clamping ring 48 threaded thereto.

Each stem 49 of the piston 50 in each cylinder 37 is secured to a plate 51 as by nuts 52 locked against complementary shaped, spherical washers 53 and 54. Screws 55 are threaded into the plate 51 and each of them has a threaded portion for the first pair of nuts 56 located between the plate 51 and the flange 36 and extending freely therethrough and a second pair of nuts 57 located above the flange 36. By this means, travel of the stem 49 is adjustably limited and it will be noted that there is a ball-bearing unit 58 interposed between the plate 51 and the thrust ring 59 and locked in place by the nut 60 threaded on the inner end of the sleeve 39.

A cage 61 is seated between bushings 62 and 63 of which the former is located adjacent the mouth of the mandrel 46 while the latter engages a thrust nut 64 threaded into the mandrel end 45 and locked by the lock nut 65.

The cage 61 has a series of bores 66 that are forwardly and inwardly inclined to receive the burnishing rolls 67. The exposed end portions of the rolls 67 operatively engage the work generally indicated at 68 and the other end portions are entrant of chambers 69 in which there are located compression springs 70 engaging roll collars 71. Between the ends of each roll 67 and a thrust plate 72 is a ball-bearing 73 while a ball-bearing unit 74 is interposed between the plate 72 and the proximate end flange 28 of the body 20.

From the foregoing it will be apparent that the rolls 67 are slidable along their axes so that their work engaging end portions, shown as being chambered, may move axially relative to their cage 61 closer to or further away from the axis of the tool. This movement of the rolls is attended by relative movement between the body 20 and the sleeve 39 and results when outward pressure on the work engaging ends of the rolls varies from a predetermined standard.

In order for the burnishing rolls to be effective, it is necessary to provide opposition to their axial movement in response to their contact with the work, and this opposition is desirably adjustable. Such opposition can be economically and efficiently effected by means of double acting air operated piston cylinder units.

The cylinders 37 are shown, see Fig. 3, as having conduits 75 and 76 in communication therewith on opposite sides of their pistons 50. The conduits 75 and 76 are flexible and are connected to a regulated supply of air under pressure indicated at 77. A valve 78 is normally positioned to connect the conduit 76 to the supply but is adapted to be operated by the solenoid 79 to connect the conduit 76 to the indicated exhaust 80 which is provided with an adjustable needle valve 81 thus to permit movement of the pistons 50.

It will be appreciated that the cylinder-piston units must be held against rotation and, for this reason, the flange 36 is shown as having a guide 82 adapted to slidably engage some suitable support such, for example, as the supporting post 13 of the drill press.

From the foregoing, it will be appreciated that the air cylinders are effective to yieldably urge the rolls 67 into operative engagement with the work and to yieldably oppose their movement apart away therefrom so that they will be held in contact to effect the burnishing of cylindrical work and to ensure that such burnishing is effectively attained even with appreciable variations in its diameter which would not be possible were the outward movement of the rolls not yieldably opposed.

A preferred control of the opposition of the air cylinders to relative axial movement between the body 20 and the sleeve 39 utilizes a circuit having a lead 83 in which there is a normally open limit switch 84, a relay 85, and a lead 86 to the switch 87 which is closed when the relay 85 is energized. The lead 83 has parallel leads 88 and 89. The lead 88 includes the normally closed limit switch 90 and the switch 87 so that it becomes a holding circuit from the time the normally open switch 84 is closed until the normally closed switch 90 becomes opened. These limit switches are shown as arranged to be actuated by predetermined axial movement of the drill press spindle 12. Lead 89 includes the solenoid 79 and the switch 91 which is closed whenever the relay 85 is energized.

In operation, air is vented from the upper part of the cylinders during the downward work stroke. As a consequence, the mandrel 46 is raised and the rolls 67 are yieldably urged towards each other. At the end of that stroke, the normally closed limit switch 90 is opened, thus permitting the valve 78 to assume its position in which it again connects the upper parts of the cylinders to the pressure source so that pressure is exerted against both sides of the pistons and the mandrel is moved downwardly and the rolls 67 moved further apart. When the tool again reaches the point at which another working stroke commences, another cycle is initiated.

What I therefore claim and desire to secure by Letters Patent is:

1. In a burnishing tool for cylindrical work, a drive spindle including a body, a sleeve slidably splined to said body for axial movement relative thereto and including a mandrel, a rotatable set of burnishing rolls arranged with their axes forwardly and inwardly inclined with respect to the spindle axis for engagement with the work by corresponding end portions, said rolls being axially slidable relative to said mandrel to enable their spacing relative to the spindle axis to vary on such sliding movement between a first position in which their work engaging end portions are operatively positioned relative to the work and a second position in which said work engaging end portions are inoperatively positioned with respect thereto, an anti-friction thrust coupling between the other end portions of said rolls and said body, means resiliently maintaining said other end portions of said rolls in engagement with said thrust coupling, and means yieldably opposing relative axial movement between said body and said sleeve.

2. In a burnishing roll for cylindrical work, a drive spindle including a body, a sleeve slidably splined to said body for axial movement relative thereto and including a mandrel having a set of bores that are forwardly and inwardly inclined with respect to the spindle axis, a set of burnishing rolls, one for each bore and slidable therein with corresponding end portions exposed for engagement with the work, a plurality of springs in said cage, one for each roll and operatively connected thereto to urge said rolls away from said work, an anti-friction thrust coupling between the other end portions of said rolls and said body, and means yieldably opposing relative axial movement between said body and said sleeve, movement of said sleeve relative to said body in one direction causing sliding movement of the rolls to bring their work engaging end portions closer together and in the other direction spacing them further apart.

3. In a burnishing tool for cylindrical work, a drive spindle including a body, a sleeve slidaby splined to said body for axial movement relative thereto and including a detachable mandrel, a cage rotatably carried by said mandrel, between it and said body said mandrel having a set of bores that are forwardly and inwardly inclined with respect to the spindle axis, a set of burnishing rolls, one for each bore and slidable therein with corresponding end portions exposed for engagement with the work, a plurality of springs in said cage, one for each roll and operatively connected thereto to urge said rolls away from said work, an anti-fraction thrust coupling held between the other end portions of said rolls and said body for axial movement, and means yieldably opposing relative axial movement between said body and said sleeve, movement of said sleeve relative to said body in one direction causing sliding movement of the rolls to bring their work engaging end portions closer together and in the other direction spacing them further apart.

4. In a burnishing tool for cylindrical work, a drive spindle, a hollow body attached at one end to said spindle and provided at its other end with an out-turned flange, a sleeve slidably splined to said body for axial movement relative thereto and including a head overlying said flange and a mandrel attached to said head, a cage rotatably confined by said mandrel, a set of burnishing rolls carried by said cage with their axes forwardly and inwardly inclined with respect to the spindle axis for engagement with the work by corresponding end portions, and being slidable in said cage relative to said mandrel to enable their spacing relative to the spindle axis to vary on such sliding movement between a first position in which their work engaging end portions are operatively positioned relative to the work and a second position in which said work engaging end portions are inoperatively positioned with respect thereto, an anti-friction thrust coupling between the other end portions of said rolls and said flange, means resiliently maintaining said other end portions of said rolls in engagement with said thrust coupling, and means yieldably opposing relative axial movement between said body and said sleeve.

5. In a burnishing tool for cylindrical work, a drive spindle including a body member, a sleeve member slidably splined to said body member for axial movement relative thereto and including a mandrel, a rotatable set of burnishing rolls arranged with their axes forwardly and inwardly inclined with respect to the spindle axis for engagement with the work by corresponding ends thereof, said rolls being axially slidable relative to said mandrel to enable their spacing relative to the spindle axis to vary on such sliding movement, an anti-friction thrust coupling between the other end portions of said rolls and said body member, and means opposing relative axial movement between said body member and said sleeve member, said means including a cylinder attached to one of said members to enable the member to which it is attached to rotate independently thereof, an anti-friction member connected to the other of said members to enable said other member to rotate independently thereof, and means to adjust the spacing between said pistons and cylinders.

6. In a burnishing tool for cylindrical work, a spindle including a body provided with an end flange and an intermediate shoulder, a sleeve slidably splined to said body for axial movement relative thereto between said shoulder and said flange, said sleeve including a mandrel, a hub including offset flange, an anti-friction element between one of said flanges and said body shoulder, a disc surrounding said sleeve, a piston-cylinder connection between said other offset flange and said disc, and a supporting connection between said disc and said sleeve including an anti-friction member, an adjustable connection between said disc and the associated flange operable to adjust the stroke of the piston-cylinder connection, and a rotatable set of burnishing rolls arranged with their axes forwardly and inwardly inclined with respect to the spindle axis for engagement with the work by corresponding end portions, said rolls being axially slidable relative to said mandrel to enable their spacing relative to the spindle axis to vary on said sliding movement, and an anti-friction thrust coupling between said rolls and said body.

References Cited in the file of this patent

UNITED STATES PATENTS

| | | |
|---|---|---|
| 956,334 | Gallon | Apr. 26, 1910 |
| 1,111,482 | Massmann et al. | Sept. 22, 1914 |
| 1,853,641 | Seward | Apr. 18, 1931 |
| 2,002,317 | Hoke | May 21, 1935 |
| 2,008,002 | Calkins | July 16, 1935 |
| 2,188,629 | Giesey et al. | Jan. 30, 1940 |
| 2,287,559 | Nye | June 23, 1942 |
| 2,387,453 | MacGuire et al. | Oct. 23, 1945 |
| 2,835,958 | Mock et al. | May 27, 1958 |
| 2,841,861 | Williams | July 8, 1958 |